(12) United States Patent
Gill

(10) Patent No.: US 11,079,267 B2
(45) Date of Patent: Aug. 3, 2021

(54) ISOLATED CAPACITIVE LIQUID LEVEL PROBE

(71) Applicant: Gill Corporate Limited, New Milton (GB)

(72) Inventor: Michael John Gill, Hampshire (GB)

(73) Assignee: GILL CORPORATE LIMITED, New Milton (GB)

( * ) Notice: Subject to any disclaimer, the term of this patent is extended or adjusted under 35 U.S.C. 154(b) by 187 days.

(21) Appl. No.: 16/306,307

(22) PCT Filed: Apr. 21, 2017

(86) PCT No.: PCT/EP2017/025096
§ 371 (c)(1),
(2) Date: Nov. 30, 2018

(87) PCT Pub. No.: WO2018/001567
PCT Pub. Date: Jan. 4, 2018

(65) Prior Publication Data
US 2019/0137318 A1    May 9, 2019

(30) Foreign Application Priority Data
Jun. 28, 2016 (GB) .................................. 1611230

(51) Int. Cl.
*G01F 23/26* (2006.01)
*G01F 23/04* (2006.01)

(52) U.S. Cl.
CPC ............ *G01F 23/266* (2013.01); *G01F 23/04* (2013.01); *G01F 23/268* (2013.01)

(58) Field of Classification Search
CPC ...... G01F 23/266; G01F 23/04; G01F 23/268; G01F 23/24; G01F 23/265
See application file for complete search history.

(56) References Cited

U.S. PATENT DOCUMENTS

| 5,546,005 A * | 8/1996 | Rauchwerger ........ G01F 23/266 |
| | | 324/664 |
| 5,973,415 A | 10/1999 | Brenner et al. |
| 2013/0269432 A1* | 10/2013 | Brutschin ............... G01F 23/44 |
| | | 73/313 |
| 2014/0315501 A1* | 10/2014 | Rudell ..................... H04B 1/18 |
| | | 455/78 |

* cited by examiner

*Primary Examiner* — David Z Huang
(74) *Attorney, Agent, or Firm* — The Small Patent Law Group LLC; Jason P. Gross

(57) ABSTRACT

A measurement device (10) comprising a sensing circuit (30) which is electrically floating and fully isolated. The sensing circuit (30) has a first (134) and a second (148) transformer across which is connected a measurement circuit (110). The device is so constructed that any signal generated in the coil (132) of the said first transformer (134) that is connected to the measurement circuit (110) caused by a change in any external magnetic field relative to the measurement circuit (110) is in anti-phase with the corresponding signal generated in the coil (164) of the said second transformer (148) that is connected to the measurement circuit (110).

6 Claims, 3 Drawing Sheets

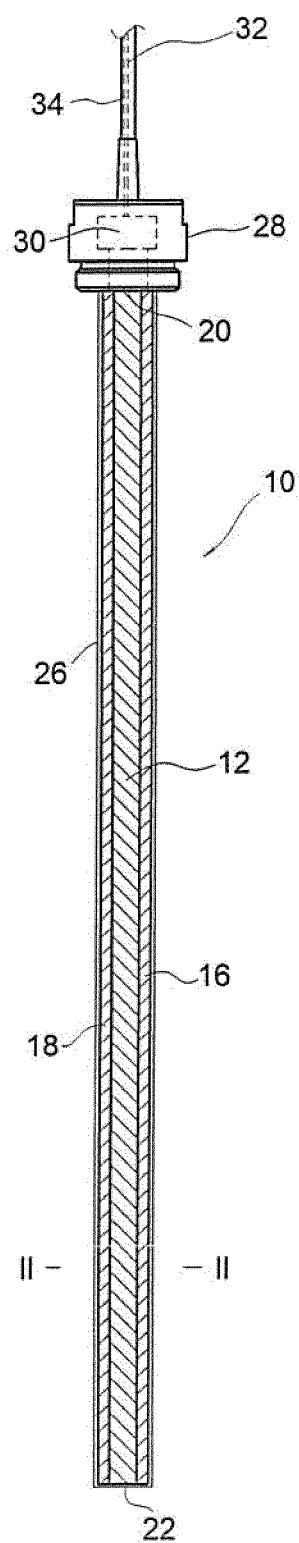
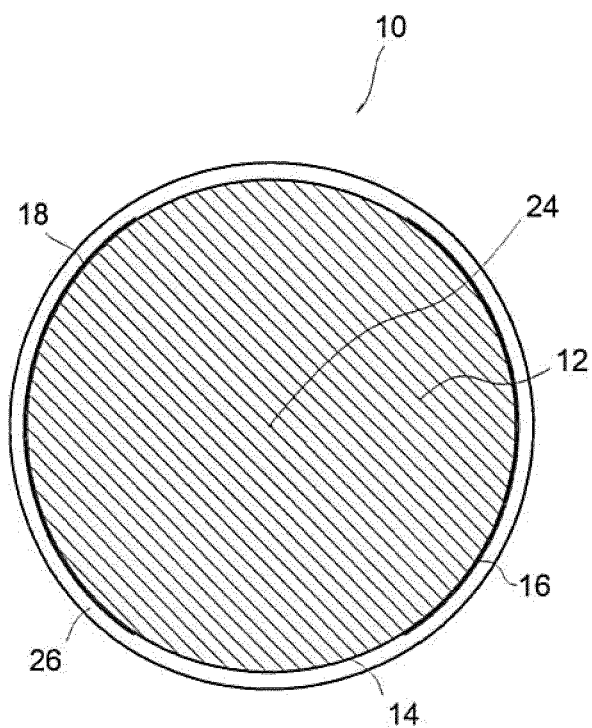
Fig. 1
Fig. 2

ISOLATED CAPACITIVE LIQUID LEVEL PROBE

RELATED APPLICATIONS

The present application is a National Stage of International Application No. PCT/EP2017/025096, filed on Apr. 21, 2017, and claims the benefit of United Kingdom Patent Application No. 1611230.2, filed on Jun. 28, 2016, each of which is incorporated by reference herein.

BACKGROUND

The present invention relates to a measurement device comprising a sensing circuit which is electrically floating and fully isolated, the sensing circuit having a first and a second transformer across which is connected a measurement circuit.

A previously proposed measurement device is described and illustrated in GB 2532266 A. The full contents of that specification are hereby imported into this present specification by direct reference. It describes a capacitive fluid level sensor which comprises an electrically insulative support which carries at least two elongate electrodes which are spaced apart from one another uniformly along their lengths, and measurement circuitry connected to the said at least two elongate electrodes to provide a measure which is indicative of the level of fluid into which the support is immersed when the sensor is in use.

A problem, is encountered with such a construction in the presence of stray external electromagnetic radiation, for example, in that the resulting changes in the external electromagnetic field may adversely interfere with the measurement which is made.

The present invention seeks to provide a remedy.

SUMMARY OF EMBODIMENTS OF THE DISCLOSURE

In one or more embodiments, a measurement device is provided that includes a sensing circuit which is electrically floating and fully isolated. The sensing circuit has a first and a second transformer across which is connected a measurement circuit, wherein the device is so constructed that any signal generated in the coil of the said first transformer that is connected to the measurement circuit caused by a change in any external magnetic field relative to the measurement circuit is in anti-phase with the corresponding signal generated in the coil of the said second transformer that is connected to the measurement circuit.

BRIEF DESCRIPTION OF THE DRAWINGS

An example of a measurement device made in accordance with one or more embodiments will now be described in greater detail with reference to the accompanying drawings, in which:

FIG. 1 is an axial sectional view of a measurement device embodying an embodiment, with the thickness of some parts being exaggerated, for the sake of clarity;

FIG. 2 shows, on a different scale, a cross-sectional view of the measurement device shown in FIG. 1 taken in the plane indicated by the line of FIG. 1;

DETAILED DESCRIPTION OF EMBODIMENTS OF THE DISCLOSURE

Figure 3:
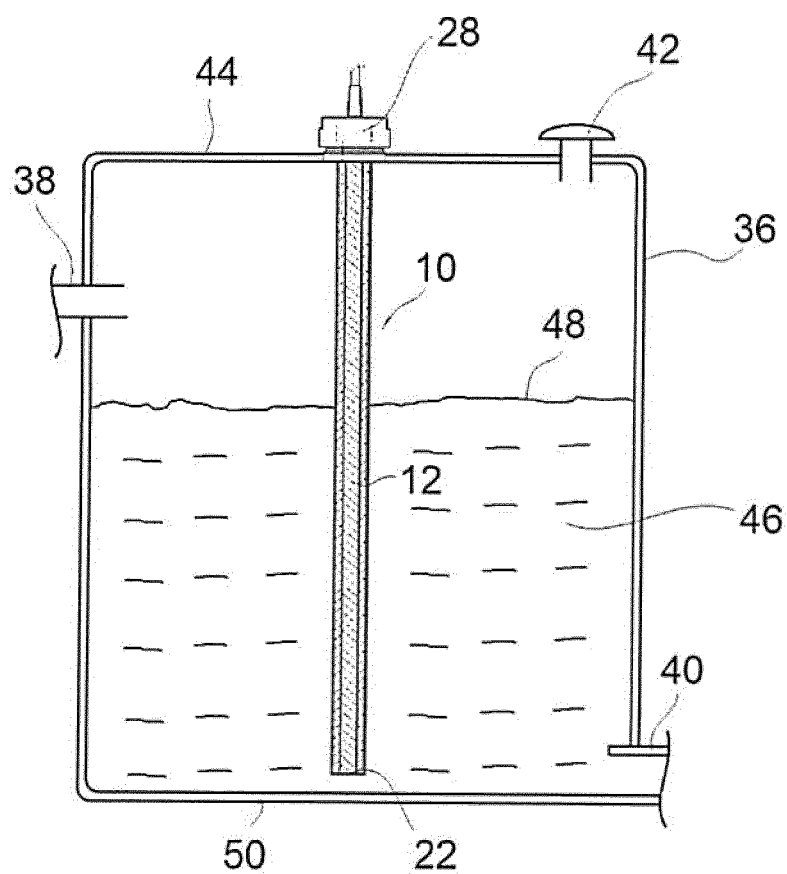
FIG. 3 shows an axial section view of the measurement device shown in FIGS. 1 and 2 having a part located in a tank containing a liquid.

Accordingly, the present invention is directed to a measurement device having the construction set out in the opening paragraph of the present specification, characterized in that the device is so constructed that any signal generated in the coil of the said first transformer that is connected to the measurement circuit caused by a change in any external magnetic field relative to the measurement circuit is in anti-phase with the corresponding signal generated in the coil of the said second transformer that is connected to the measurement circuit.

Such a construction is less susceptible to errors brought about by stray electromagnetic radiation.

It will be appreciated that two signals are in antiphase with each other when the difference in phase between those signals is Π radians, or 180°, If the coils of the transformers connected to the sensing circuit are in phase with each other then any noise signal created in the sensing circuit as a result of stray electromagnetic radiation would be transmitted to and measured by the measurement circuit owing to the interwinding capacitances of the transformers. However, by ensuring that those respective coils of the transformers which are connected to the sensing circuit are in anti-phase with each other, the adverse effect of the stray electromagnetic radiation is reduced or eliminated, for example in that the phase of the signal across the interwinding capacitances of the transformer is corrected.

The coils may be in anti-phase with each other either by virtue of the manner in which way round the coil is connected in the sensing circuit relative to the connection of the associated transformer to the measurement circuit, or by the relative handedness of the respective coils, or by the physical orientation of one transformer relative to the other.

Preferably, the said first and second transformers are bifilar wound transformers.

This reduces the cost of the device.

The measurement device may be constituted by a liquid level sensor.

Preferably the sensing circuit of the measurement device comprises at least two elongate electrodes which are spaced apart from one another uniformly along their lengths.

This facilitates use of the device as a fluid level sensor.

The elongate electrodes may be coated with or surrounded by electrically insulative material.

The measurement circuit may provide a measure of the level of fluid into which the elongate electrodes of the sensing circuit are immersed when the sensor is in use, by means of measuring the impedance across the elongate electrodes immersed in the fluid.

The present invention extends also to a method of providing a measure of the level of a fluid, using a measurement device in accordance with the present invention.

The measurement device 10 shown in FIGS. 1 and 2 comprises an elongate electrically insulative rod 12 made of fiberglass. In this embodiment the rod is solid throughout its interior. It is of uniform cross-section throughout its length. Its cross-section is circular so that it has an elongate cylindrical outside surface 14.

Two thin elongate electrically conductive thin copper foil electrodes 16 and 18 are glued to that outside cylindrical surface 14 of the rod 12 so that they extend along that surface from the intended upper end 20 of the rod 12 to the intended lower end 22. Both electrodes 16 and 18 are of uniform width along their lengths, are of the same width as one another, and are arranged spaced apart from one another and diametrically opposite one another with respect to any given cross-section of the rod 12. The two electrodes 16 and 18 are generally parallel to one another. In any given cross-section of the rod 12, the angle subtended by one of the electrodes 16 or 18 from the axis 24 of the rod 12 is about 110° so that the gap between adjacent respective edges of the two electrodes 16 and 18 is about 70° in any given cross-section of the rod 12.

The whole of the outside cylindrical surface 14 of the rod, as well as its intended lower end 22, is encapsulated in an electrically insulative non-stick plastics material, namely polytetraflouroethylene (Teflon®) in the form of a coating 26. This provides insulation between the electrodes 16 and 18 even when the latter are immersed in an electrically conductive liquid 46, so that the measurement device 10 is effective even for such liquid, and reduces further the likelihood that any material will stick to the rod 12 that would give an erroneous reading.

Attached to the intended upper end 20 of the rod 12 is a housing 28 which houses circuitry 30 (shown in broken lines) electrically connected to both electrodes 16 and 18 and provided with output connections 32 and 34 (also shown in broken lines) across which an electrical signal output is generated when the measurement device 10 is in use to indicate the level of liquid 48 in which the rod 12 is immersed. To this end the circuitry 30 is constructed and/or programmed to provide such an output signal which is a measure of the value of the impedance of the electrodes 16 and 18 together with the liquid 46 within which they are immersed. The manner in which measurement of the impedance is effected uses an impedance measurement technique, One way in which the measurement device 10 can be used is shown in FIG. 3. This illustrates a human waste tank 36 of a marine vessel (not shown), the tank 36 having an inlet 38, an outlet 40, and a carbon filtered air outlet 42. The measurement device 10 depends from an upper wall 44 of the tank 36 so that its rod 12 extends within the interior of the tank 36 in a generally upright position, with the housing 28 uppermost and screwed or otherwise connected firmly to the upper wall 44. The tank 36 contains liquid human waste, also referred to as blackwater, 46. The level 48 of that liquid is indicated by the measurement device 10. Further display equipment (not shown) may be provided, connected to the output connections 32 and 34, to provide an indication, either at regular intervals or continuously, of the level of the blackwater 46 in the tank 36.

Figure 4:
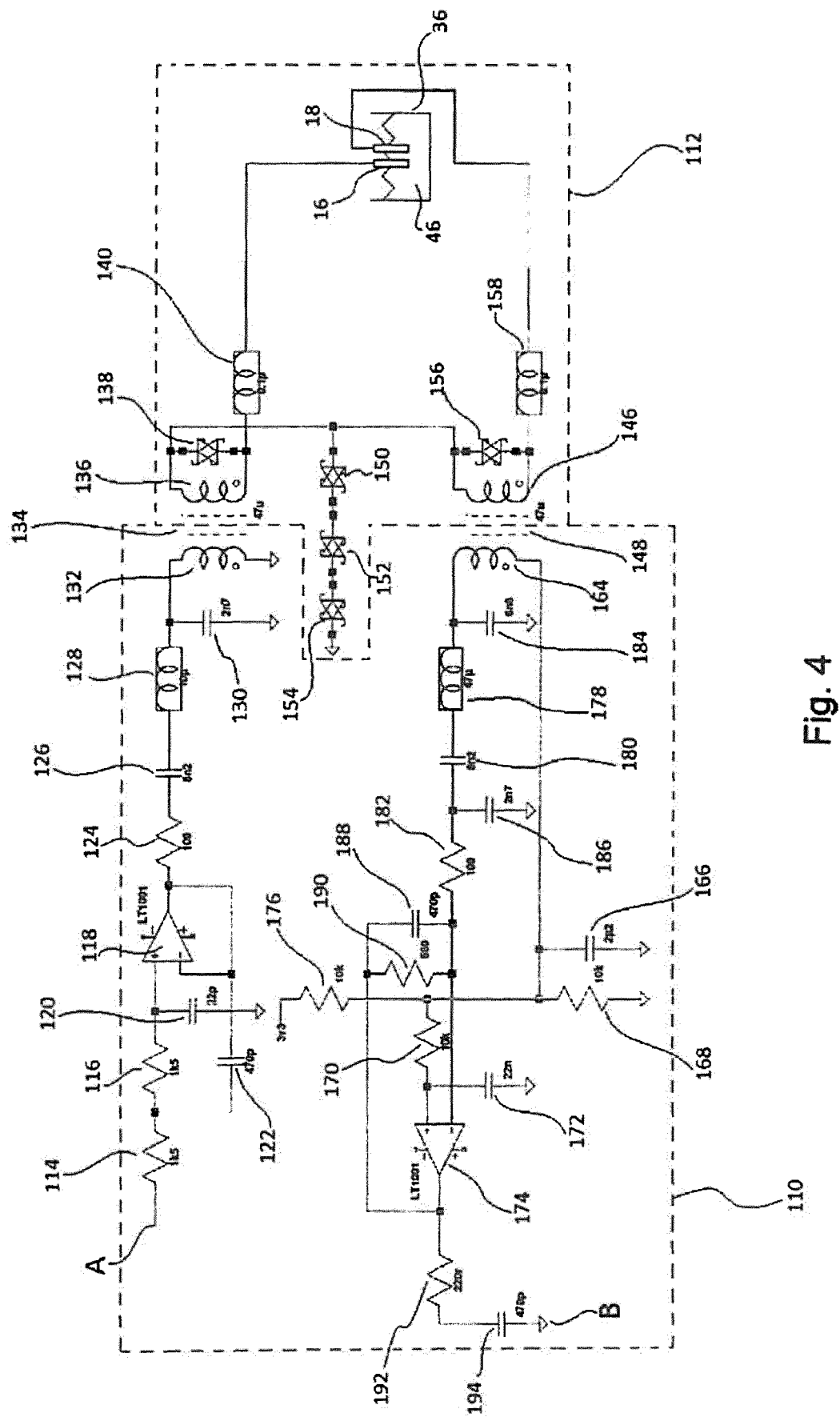
FIG. 4 is a circuit diagram of circuitry present in the measurement device shown in FIGS. 1 and 2.

Details of the circuitry 30 are shown in FIG. 4. Thus the circuitry 30 comprises a measurement circuit 110 and a sensing circuit 112. Progressing from point A in the measurement circuit 110, shown in that Figure, to point B, two resistors 114 and 116 are connected in series to a positive input of a differential amplifier 118. A capacitor 120 connects the positive input of the differential amplifier 118 to ground. A capacitor 122 is connected between a point between the two resistors 114 and 116 and a negative input of the differential amplifier 118, which negative input is also connected to an output of the differential amplifier 118. A resistor 124, a capacitor 126 and a coil 128 are connected in series in that order between the output of the differential amplifier 118 and a first coil 132 of a subtractive polarity transformer 134. The first end of the coil 132 is connected to ground via a capacitor 130, and the other end of coil 132 is connected to ground directly. A triac 138 is connected across the outputs of the second coil 136 of the transformer 134. One end of the coil 136, corresponding to the end of the coil 132 which is connected directly to ground, is connected to the electrode 16 via a coil 140. As shown in FIG. 3, the electrode 16 along with the electrode 18 in the rod 12 is immersed in an electrically conductive liquid 46 the depth of which is to be measured, contained in the tank 36. The other end of the second coil 136 of transformer 134 is connected to the end of complimentary polarity of a coil 146 of a second subtractive polarity transformer 148. Three triacs, 150, 152 and 154, are connected in series with one another between a point on the conductor that connects the coils 132 and 146 and a floating ground. A triac 156 is connected across the outputs of the coil 146 of the transformer 148. The other end of the coil 146 of the transformer 148 is connected to the electrode 18 via a coil 158. A first end of the coil 164 of the transformer 148 is connected to ground via a capacitor 166 and a resistor 168 in parallel with the capacitor 166. The first end of the coil 164 is also connected to a positive input of a differential amplifier 174 via a resistor 170. That positive input is also connected to ground via a capacitor 172. The first end of the coil 164 is also connected to a 3.3 volt electric supply via a resistor 176. The second end of the coil 164 of the transformer 148 is connected to the negative input of the differential amplifier 174 via a coil 178, a capacitor 180 and a resistor 182 connected in series with one another in that order. The second end of the coil 164 of the transformer 148 is also connected to ground via a capacitor 184. A point on the conductor between the capacitor 180 and the resistor 182 is connected to ground via capacitor 186, A capacitor 188 and a resistor 190 are connected in parallel between the negative input of the differential amplifier 174 and the output thereof. The output of the said differential amplifier 174 is also connected to ground (labelled B) via a resistor 192 and a capacitor 194 connected in series with one another.

The values of the various electrical components of the circuitry 30 are shown in FIG. 4.

Some or most of the electrical components illustrated in FIG. 4 may be embodied within a microchip.

A measure of the impedance of the combination of the electrodes 16 and 18 and the liquid 46 in which they are immersed is provided at the output of the differential amplifier 174.

When the measurement device is in use, an AC signal is applied at point A at 480 kHz. The said signal is transmitted through the transformer 134, through the electrode 16, through the liquid 46 the depth of which is to be measured, into the electrode 18, through the transformer 148 and the in-phase (magnitude) and quadrature (phase) components of the voltage and current of the received signal are measured after the differential capacitor 174. The components of in-phase voltage, quadrature voltage, in-phase current, and quadrature current, may be represented as $V_0$, $V_{90}$, $I_0$, and $I_{90}$ respectively.

The measured impedance, $Z_m$, is given by the equation:

$$Z_m = V_0 + jV_{90}/I_0 + jI_{90}$$

The measured impedance is related to capacitance by the following equation:

$$Z_m = 1/j\omega C$$

where $\omega$ is the known frequency, C is the capacitance and j represents $\sqrt{-1}$.

The capacitance of the electrodes 16 and 18 in the tank when empty may be represented as Ce and when full, with substantially the whole of the rod 12 immersed in the blackwater, as Cf. Ce and Ct will differ because part of the electrostatic field generated between the electrodes 16 and 18 by virtue of an electrical potential difference between those electrodes extends into locations which are outside the rod, so that the presence or absence of material, and the dielectric constant of that material, will affect the value of the capacitance of the electrodes 16 and 18. The measured capacitance Cm is then given by the equation:

$$C_m = C_f \cdot (d/l) + C_e \cdot ((l-d)/l)$$

in which l is the known length of the rod 12, and d is the depth to which the rod 12 is immersed in the blackwater 46, being the depth of the blackwater 46 in the tank 36 less the distance between the lower end 22 of the rod 12 and the interior surface of the bottom wall 50 of the tank 36.

The above equation yields the depth d as:

$$d = l \cdot (C_m - C_e)/(C_f - C_e)$$

$C_e$ and $C_f$ can be determined during a calibration exercise at the time of installation, whereafter the value of Cm is determined by the electrical circuitry 30 and with a knowledge of the fixed distance l can provide an indication of the depth d.

Numerous variations and modifications to the illustrated measurement device 10 may occur to the reader without taking the resulting construction outside the scope of the present invention.

For example, coils 136 and 146 of the transformers 134 and 148 connected to the sensing circuit 112 may be placed in anti-phase with each other by virtue of their relative handedness to each other, or their relative physical orientation relative to each other.

The rod 12 may be a hollow cylinder, or the electrodes 16 and 18 could extend through the interior of the rod 12 provided they have at least portions along the outer elongate cylindrical surface 14, even if those portions are a little below that surface. The two electrodes 16 and 18 could meander, provided the spacing between them is uniform along the length of the rod 12.

The length of the rod 12 may be in the region from 20 cm to 3 metres, and its cross-sectional diameter may be in the region from 5 mm to 5 cm.

The angle subtended by one of the electrodes 16 or 18 may be greater or smaller than 110°, It may be up to a value just less than 180°, so that the electrodes 16 and 18 almost, but do not quite, touch one another.

The electrodes 16 and 18 may be made of an electrically conductive material other than copper.

The rod 12 may be made of carbon fiber instead of fiberglass, or indeed of any electrically insulative material. It may even be made from an electrically conductive material, provided that there is electrically insulative material between it and the electrodes 16 and 18, so that, with such electrically insulative material, even an electrically conductive rod can be used to provide an electrically insulative support.

More than two electrodes may be provided. For example four or six or more may be provided, spaced apart from one another around the rod 12, with alternate electrodes being electrically connected to one another to form two electrically separate masses of electrically conductive material the elements of which interdigitate.

The invention claimed is:

1. A measurement device comprising a circuit which comprises a measurement circuit and a sensing circuit, the measurement circuit having a first and a second transformer, the measurement circuit being connected across the sensing circuit such that a coil of the first transformer and a coil of the second transformer are connected to the sensing circuit, the sensing circuit being floating and fully isolated and comprising two elongate electrodes which are spaced apart from one another uniformly along their lengths and the measurement circuit being connected to measure the impedance across the two electrodes in which the coil of the first transformer that is connected to the sensing circuit is oppositely connected or oriented or handed to the coil of the second transformer that is connected to the sensing circuit, whereby any signal generated in one of those coils caused by a change in any external magnetic field relative to the sensing circuit is in anti-phase with a signal generated in the other of those coils caused by the change, the coil of the first transformer that is connected to the sensing circuit being connected to one of the two elongate electrodes of the sensing circuit, and the coil of the second transformer that is connected to the sensing circuit being connected to the other of the two elongate electrodes of the sensing circuit.

2. A measurement device according to claim 1, wherein the first and second transformers are bifilar wound transformers.

3. A measurement device according to claim 1, wherein the elongate electrodes are coated with or surrounded by electrically insulative material.

4. A measurement device according to claim 1, wherein the measurement circuit provides a measure of the level of fluid into which the elongate electrodes of the sensing circuit are immersed when the sensor is in use, by means of measuring the impedance across the two elongate electrodes immersed in the fluid.

5. A liquid level sensor comprising the measurement device of claim 1.

6. A method of providing a measure of the level of a fluid, using the measurement device of claim 1.

* * * * *